United States Patent Office 3,630,989
Patented Dec. 28, 1971

3,630,989
STABILIZATION OF UNVULCANIZED INTERCONNECTED RUBBERY DIENE POLYMERS WITH A COMPLEX OF AN ARYL BORATE AND A N-ALKYL TRIMETHYLENE DIAMINE
Jerry Donald Hunt, Cuyahoga Falls, and Robert Paul Spitz and Edward Leo Kay, Akron, Ohio, assignors to The Firestone Tire & Rubber Company, Akron, Ohio
No Drawing. Filed June 30, 1969, Ser. No. 837,892
Int. Cl. C08d 9/00, 11/04
U.S. Cl. 260—33.6 AQ       5 Claims

ABSTRACT OF THE DISCLOSURE

An unvulcanized interconnected rubbery homopolymer derived from conjugated dienes of 4 and 5 carbon atoms and copolymers thereof with olefins is stabilized by a complex of equimolar amounts of an aryl borate and N-alkyl trimethylene diamine.

This invention relates to stabilizers for rubbery stereoregular homopolymers of conjugated diolefins of 4 and 5 carbon atoms and copolymers thereof with olefins, and more particularly the rubbery copolymer of butadiene and styrene, and especially the unvulcanized, oil-diluted interconnected (or jumped) polymers.

The term "polymer" is used herein to include homopolymers and copolymers.

The stabilizer is a complex of equimolar amounts of a triaryl borate and N-alkyl trimethylene diamine in which the alkyl group comprises about 8 to 18 carbon atoms and is often a mixture, which may be unsaturated or comprise hydroxy or other substituents common in chains of fatty acids. The preferred compounds are Duomeen complexes derived from equimolar amounts of a Duomeen and triphenyl borate. Duomeens are N-alkyl trimethylene diamines produced by Armour Industrial Chemical Co. They include Duomeen C N-coco-1,3-diaminopropane and derived from coconut oil—the chief alkyl constituent of which is the lauryl group, but it normally also includes capryl, myristyl, palmityl and oleyl radicals) and Duomeen L-11 (the alkyl group of which comprises 11 carbon atoms).

The borate may be triphenyl borate, any tritolyl borate, either alpha- or beta-naphthyl borate or the like.

The N-alkyl trimethylene diamines are complexed to render them less reactive and thus lessen the possibility of reactions of them with compounds of the compounded rubber compositions.

From 0.005 to 5 phr. (parts per 100 parts of polymer) of stabilizer will be used, and preferably 0.1 to 2 parts.

Unvulcanized interconnected rubbery polymers are those in which the viscosity and molecular weight have been jumped or otherwise substantially increased by reaction of the initially produced linear polymer with a suitable reagent to increase the molecular weight and at the same time the branching of the polymer. One type of such reaction is exemplified by the reaction of silicon tetrachloride with a live polybutadiene produced by polymerization of butadiene in a non-aqueous system by means of a lithium-based catalyst (e.g., butyllithium or tetramethylene dilithium), the interconnected polymer containing a silicon atom in the center with four hydrocarbon polymer fragments extending therefrom to form a "star." Another type of such interconnecting reaction, termed "jumping," is exemplified by the procedure described by E. F. Engel et al., Rubber Age, December 1964, pages 410–415; any unsaturated rubbery polymer can be jumped by treatment with a two-part catalyst consisting of a Friedel-Crafts catalyst plus a cocatalyst, such as titanium tetrachloride and thionylchloride or ethylaluminum sesquichloride and water.

Another type of molecular-weight-increasing-reaction, or interconnecting (jumping) reaction, is exemplified by the reaction of an olefinically unsaturated rubbery polymer with a halogenated organic compound (e.g. ethylene dichloride) in the presence of a strong base (e.g. butyllithium) to produce a mixture of higher molecular weight rubbery polymers of branched construction, and, typically exemplified by a mixture of polymers having a molecular weight distribution including the original molecular weight of the unreacted rubbery polymer to molecular weights of dimers, trimers, tetramers and higher polymers of the original rubbery polymer. All of these polymers of increased molecular weight contemplated by the invention have improved ability to accept diluting oil and possess good milling and extruding properties ("processing" properties) when extended with oil. From 10 to 100 parts of processing oil, or thereabout may be added to 100 parts of the polymer.

Difficulty has been experienced in stabilizing many oil-diluted rubbery polymers. The stabilizer of this invention provides excellent stabilization of unvulcanized oil-diluted interconnected rubbery polymers, i.e. an unvulcanized linear rubbery polymer which has been interconnected and oil diluted. The invention finds widest use in the stabilization of such copolymers of butadiene and styrene but is useful with other interconnected rubbery polymers, and particularly those derived from the polybutadienes, polyisoprenes and butadiene-isoprene copolymers of any stereo composition. Polymers suitable for use in the interconnecting reaction can be conveniently made by the methods of U.S. Pat. No. 3,317,918, for example.

Any of the oils commonly used in the dilution of rubbers can be employed, including particularly higher boiling petroleum fractions such as the commercially known naphthenic and aromatic mineral oils. In the dilution of rubbers with oils, about 37.5 parts of oil are customarily used with 100 parts of polymer, although the amount of oil can vary from 10 to 100 parts, more or less. The oil preferably is added to the polymer after the polymerization and interconnecting reactions are completed. The stabilizer can be added prior to the addition of the oil, it can be added with the oil, or it can be added soon thereafter.

The stabilizer is incorporated into the polymer in the usual manner. The stabilizing effect is recognized by the lessening of the decrease in the viscosity of the polymer on heat aging. The stabilizers are added to protect the polymer during storage and processing. The vulcanizates are useful wherever rubber vulcanizates have been employed, as in the manufacture of tires, hose, and a wide variety of products.

The polymer used in the tests recorded in the following table was prepared by reaction of $SiCl_4$ with live butadienestyrene copolymer obtained through continuous non-aqueous polymerization utilizing butyllithium as a catalyst. A polymer cement-oil masterbatch was prepared containing 37.5 parts of processing oil per 100 parts of polymer, and the stabilizers of this invention were added to portions of the masterbatch to produce the samples for aging studies.

These masterbatch samples were desolventized on a drum drier. Each dried polymer masterbatch sample was milled to achieve homogeniety and samples of the appropriate size were cut from each of the milled polymers. A Mooney viscosity (ml./4/212° F.) determination was made on each sample prior to aging. Samples containing the various stabilizers were then aged in a forced air oven at 75° C. for various periods of time. The results obtained with the different stabilizers of this invention are recorded in the following table.

Test were made with the interconnected polymer, as described, but produced at different times. In the following table these are identified as polymers A, B and C. The table includes tests on the change in Mooney viscosity (ml./4/212° F.) after aging, as described, for 2, 4 and 6 days, and includes tests on polymers containing no stabilizer and polymers containing a commercial stabilizer as well as tests on the polymers containing 0.5 phr. of complexes of equimolar amounts of a Duomeen and a triaryl borate.

The complexes were made by dissolving one molar equivalent of the triaryl borate in methylene chloride and adding one molar equivalent of the Duomeen. An exothermic reaction occurs and the mixture is stirred briefly. The solvent is removed to obtain the complex.

TABLE

| Stabilizer | Polymer | Percent retention of Mooney viscosity (ml./4/212° F. after aging) for— | | |
|---|---|---|---|---|
| | | 2 days | 4 days | 6 days |
| None | A | 91 | 79 | 69 |
| | B | 87.5 | 80.5 | 73.5 |
| | C | 90 | 85 | |
| Commercial | A | 93 | 89 | 87 |
| | B | 94 | 87 | 89 |
| | C | 100 | 102 | |
| Duomeen C | A | 94.5 | 91 | 89 |
| Duomeen C Complex of tri-(p-t-octylphenyl) borate | A | 94.5 | 93 | 91 |
| Tri(p-chlorophenyl) borate | B | 96 | 97 | 91 |
| Triphenyl borate | C | 106 | 115 | |
| Duomeen L-11 | (¹) | 95 | | 87 |

¹ No test was made on the unstabilized polymer in which this was tested, or on this polymer containing commercial stabilizer. The reported test contained only 0 3 phr. of Duomeen L-11.

The test results show definite stabilization of the polymers.

The stabilized oil-diluted polymers of the invention are useful in practically every instance in which conventional oil-diluted SBR, oil-diluted natural rubber and oil-diluted rubbery polymers have been useful, including, without limitation, use in pneumatic tire treads, sidewalls and carcass stocks. Also the stabilized polymers of the invention can be blended with other known polymers to provide useful commercial compositions for fabrication into useful shapes and articles. The stabilized polymers of the invention are advantageously blended with known rubbers (e.g., natural rubber, polybutadienes, polyisoprenes, butadiene-styrene copolymer, isoprene-isobutylene copolymer, polychlorprene, isoprene-styrene copolymer) with or without additional oils, for forming vulcanizates of great technical importance. The novel stabilized polymers are advantageously mixed with the known reinforcing carbon blacks to produce useful commercial stocks, which also can contain one or more additional rubbery polymers, and also can contain 5 to 100 phr. of additional oil or plasticizer. Sulfur and other known vulcanizing agents for natural rubber and the commercial synthetic rubbers are useful for forming vulcanizable stocks containing the novel stabilized polymer. Known methods of mixing, forming, fabricating and curing or vulcanizing compositions of natural and commercial synthetic rubbers are applicable to and useful with compositions containing the novel stabilized polymers of the invention. The novel polymers are especially useful in pneumatic tire tread, sidewall and carcass compositions, and the considerations of this paragraph are especially relevant to the use of the novel polymers in tires.

We claim:

1. Unvulcanized interconnected rubbery polymer derived from linear homopolymers of conjugated dienes containing 4 and 5 carbon atoms and copolymers thereof with styrene, stabilized by 0.005 to 5 parts per hundred parts of polymer of a complex of equimolar amounts of a triaryl borate and N-alkyl trimethylene diamine in which the alkyl group contains 8 to 18 carbon atoms.

2. The composition of claim 1 in which the rubber polymer is interconnected butadiene-styrene copolymer.

3. The composition of claim 2 in which the copolymer is oil diluted.

4. The composition of claim 3 in which the borate/diamine complex is triphenyl borate/N-coco-1,3-diaminopropane.

5. The composition of claim 4 in which the alkyl group of the stabilizer contains 11 carbon atoms.

References Cited

UNITED STATES PATENTS

| | | | |
|---|---|---|---|
| 3,065,236 | 11/1962 | Young et al. | 260—462 |
| 3,242,135 | 3/1966 | Bown et al. | 260—45.95 |
| 3,244,662 | 4/1966 | Strauss et al. | 260—45.7 |
| 3,382,208 | 5/1968 | Cyba | 260—45.95 |
| 3,481,978 | 12/1969 | Sparks | 260—45.9 |
| 3,502,612 | 3/1970 | Latos | 260—45.9 |

DONALD E. CZAJA, Primary Examiner

E. C. RZUCIDLO, Assistant Examiner

U.S. Cl. X.R.

260—45.7 R, 45.9 R, 462 R

UNITED STATES PATENT OFFICE
CERTIFICATE OF CORRECTION

Patent No. 3,630,989  Dated December 28, 1971

Inventor(s) Jerry Donald Hunt, Robert Paul Spitz, and Edward Leo Kay

It is certified that error appears in the above-identified patent and that said Letters Patent are hereby corrected as shown below:

Page 1, column 2 - line 67 /ml/4/212°F/ should be --(ML/4/212°F)--.

Page 2, column 3 - line 5 /ml/4/212°F/ should be -- (ML/4/212°F) --.

Page 2, column 3 - line 18 /ml/4/212°F/ should be --(ML/4/212°F)--.

Signed and sealed this 30th day of May 1972.

(SEAL)
Attest:

EDWARD M. FLETCHER, JR.
Attesting Officer

ROBERT GOTTSCHALK
Commissioner of Patents